(12) United States Patent
Yahagi et al.

(10) Patent No.: US 9,429,778 B2
(45) Date of Patent: Aug. 30, 2016

(54) OPTICAL ISOLATOR FOR A WAVELENGTH BAND OF 600-800 NM

(71) Applicant: SHIN-ETSU CHEMICAL CO., LTD., Tokyo (JP)

(72) Inventors: Akira Yahagi, Annaka (JP); Toshiaki Watanabe, Annaka (JP); Shinji Makikawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 210 days.

(21) Appl. No.: 14/310,130

(22) Filed: Jun. 20, 2014

(65) Prior Publication Data

US 2015/0015947 A1 Jan. 15, 2015

(30) Foreign Application Priority Data

Jul. 12, 2013 (JP) .................. 2013-146110

(51) Int. Cl.

| | | |
|---|---|---|
| *G02B 5/30* | (2006.01) | |
| *G02F 1/09* | (2006.01) | |
| *C04B 35/50* | (2006.01) | |
| *C04B 35/505* | (2006.01) | |
| *G02F 1/00* | (2006.01) | |

(52) U.S. Cl.
CPC .............. *G02F 1/093* (2013.01); *C04B 35/50* (2013.01); *C04B 35/505* (2013.01); *C04B 2235/3224* (2013.01); *C04B 2235/3225* (2013.01); *G02F 1/0036* (2013.01)

(58) Field of Classification Search
CPC ...... G02B 5/3083; G02B 5/30; G02B 27/28; G02B 27/281; G02B 27/286; G02B 6/2746; G02F 1/133528; G02F 1/29; G02F 1/01; G02F 1/09; G02F 1/093; G02F 1/0955; H01S 5/0064
USPC ................ 359/483.01, 483.03, 484.1, 484.4, 359/484.01, 484.02, 484.03, 484.04; 372/703; 252/582, 585, 584, 587
See application file for complete search history.

(56) References Cited

U.S. PATENT DOCUMENTS

| | | | | |
|---|---|---|---|---|
| 3,484,152 A | * | 12/1969 | Robinson | .................. G02F 1/09 359/282 |
| 3,602,575 A | * | 8/1971 | Young | ....................... G02F 1/09 359/324 |
| 2008/0094734 A1 | * | 4/2008 | Zimmer | ................. B82Y 30/00 359/796 |

(Continued)

FOREIGN PATENT DOCUMENTS

| | | |
|---|---|---|
| JP | 05-289025 A | 11/1993 |
| JP | 2011-150208 A | 8/2011 |

(Continued)

OTHER PUBLICATIONS

Extended European Search Report dated Jul. 8, 2014, issued in counterpart European Patent Application No. 14152984.2 (5 pages).

(Continued)

*Primary Examiner* — Arnel C Lavarias
(74) *Attorney, Agent, or Firm* — Westerman, Hattori, Daniels & Adrian, LLP (57) ABSTRACT

An optical isolator for use with a wavelength band of 600-800 nm is improved in that it has a Faraday rotator made of an oxide material in which said oxide material contains $(Tb_xR_{1-x})_2O_3$ such that $0.5 \leq x \leq 1.0$, and R is scandium, yttrium or any lanthanoid but Tb.

6 Claims, 4 Drawing Sheets

(56) References Cited

U.S. PATENT DOCUMENTS

| | | | | |
|---|---|---|---|---|
| 2011/0133111 | A1* | 6/2011 | Makikawa | C04B 35/50 252/62.51 R |
| 2014/0002900 | A1* | 1/2014 | Makikawa | C04B 35/50 359/484.03 |

FOREIGN PATENT DOCUMENTS

| | | |
|---|---|---|
| JP | 2012083381 A | 4/2012 |
| JP | 2013079195 A | 5/2013 |
| WO | 2012/133200 A1 | 10/2012 |

OTHER PUBLICATIONS

Extended European Search Report dated Nov. 17, 2014, issued in counterpart European Patent Application No. 14172079.7 (6 pages).

Notice of Reasons for Refusal dated Apr. 26, 2016, issued in counterpart Japanese Patent Application No. 2013-146110, with English translation. (8 pages).

* cited by examiner

OPTICAL ISOLATOR FOR A WAVELENGTH BAND OF 600-800 NM

The present non-provisional patent application claims priority, as per Paris Convention, from Japanese Patent Application No. 2013-146110 filed on 2013 Jul. 12, the disclosure of which is hereby incorporated by reference herein in its entirety.

FIELD OF THE INVENTION

The present invention relates to an optical isolator designed for use with wavelength bands of 600 nm-800 nm, which are employed in the fields of industrial lasers for medical treatment and measurements.

BACKGROUND TECHNOLOGY

Conventionally, visible range semiconductor lasers have been adopted industrially for the applications of medical treatment and optical measurement and the like, and in recent years the applicable wavelength bands for them have expanded. The semiconductor lasers generally have the characteristics of narrow emission spectrum and high conversion efficiency, whereas the problem with them is that they are so sensitive to backward beam created by reflection that they are unstable in maintaining the properties against the reflected backward beams such as from the connection interface of optical fibers or from a substance being measured.

In order to maintain a stable operation of a semiconductor laser, it is essential that the reflected backward beam is prevented from returning to the beam emitter from which the beam was originated, and to do this an optical isolator capable of passing a forward beam but stopping a backward beam is interposed between the beam source and the object to be treated or measured so that the beam reflected from an optical fiber, for example, is stopped from returning to the beam emitter.

Now, it is necessary that the Faraday rotational angle is 45 degrees or so in order that such performance is achieved by an optical isolator. In particular, the beam entered in an optical isolator has its plane of polarization turned by 45 degrees by the Faraday rotator, and passes through an input polarizer and an output polarizer, which are respectively controlled to have particular angular positions. On the other hand the backward beam has its plane of polarization turned by 45 degrees in the counter direction by virtue of the non-reciprocation characteristic of the Faraday rotator, whereby its plane of polarization forms an angle of 90 degrees with lattice of the input polarizer so that there occurs no passage of the backward beam. The optical isolator therefore makes use of this phenomenon to allow passage of the beam in one direction only by prohibiting the passage of returning beam.

An optical isolator having such a function is composed of three main parts: a Faraday rotator, a pair of polarizers one installed on the beam entrance side and the other on the beam exist side of the Faraday rotator, and a magnet which impresses magnetic field in a direction of beam passage (beam transmission axis) of the Faraday rotator. In this kind of beam isolator, when beam enters the Faraday rotator a phenomenon is triggered such that the plane of polarization is twisted within the Faraday rotator. This phenomenon is generally called Faraday effect, and the angle by which the plane of polarization is twisted is called Faraday rotational angle, whose magnitude is denoted by θ and is represented by the following equation.

$$\theta = V \times H \times L$$

In this, V is a Verdet constant, which is determined by the material and the wavelength of the beam used for the measurement. H is magnetic flux density and L is the length of the Faraday rotator (sample length).

As is understood from the equation presented above, in order to obtain a desired Faraday rotational angle θ in a Faraday rotator having a certain Verdet constant V, the greater the magnetic flux density H is that is impressed on the Faraday rotator, the smaller may the length L of the rotator be. On the other hand, the greater the length L of the rotator is, the smaller the magnetic flux must be, so that it is possible to reduce the size of an optical isolator making use of this relationship.

Since the determinants that determine the size of an optical isolator include Verdet constant V, which is determined by the kind of the material to make the Faraday rotator and the wavelength of the measurement beam, in addition to the magnetic flux H and the rotator's length L, it is important to develop a material which enables shortening of the Faraday rotator, in order to promote downsizing of the optical isolator.

IP Publication 1 discloses an oxide which contains ytterbium oxide in an amount of 30% or greater in terms of mass ratio, as a material that enables downsizing of the optical isolator. According to the description of this IP Publication 1, it is possible to downsize an optical isolator for use with wavelength of 320-800 nm, since if this oxide is used the Verdet constant V can be 0.050 min/Oe·cm or greater and the length of the Faraday rotator can be 50 mm or smaller, and at the same time the absorption of the beam having wavelength of 320-800 nm scarcely occurs.

However, in recent years, in the fields of medical treatment and industrial measurements where semiconductor lasers are used, there has been stronger calling for downsizing of the optical isolator which is used with wavelength bands of 600 nm-800 nm, and in order to answer this calling the conventional ytterbium oxide which enables Faraday rotator to have a length of 50 mm or smaller is not sufficient a material for Faraday rotator, and a material that enables a length of 11 mm or smaller is called for.

Conventionally, there have been known materials such as TGG (terbium gallium garnet) ($Tb_3Ga_5O_{12}$) that are used to make a Faraday rotator used with wavelength of 600 nm-800 nm. The Verdet constant of TGG for use with wavelength bands of 600 nm-800 nm is as small as 0.27-0.50 min/Oe·cm, and in the case of an actually used TGG crystal, its Verdet constant is 0.46 min/(Oe·cm) or so for wavelength of 633 nm. When the Verdet constant is at the level of 0.46 min/(Oe·cm) it is necessary to use a relatively long optical passage in order to secure the function of an optical isolator, so that in consequence the problem arises that the dimension of the optical isolator becomes bulky. Incidentally, in the above, the term "min" stands for minute and is equivalent to one sixtieth of one degree of angle.

It may be thought to use glass containing lead, but such glass has a Verdet constant smaller than that of TGG in the wavelength range of 600-800 nm so that it is not a suitable material to make a Faraday rotator.

LIST OF PRIOR ART PUBLICATIONS

IP Publications

[IP Publication 1] Japanese Patent Application Publication No. 2011-150208

BRIEF DESCRIPTION OF THE INVENTION

Problems the Invention Seeks to Solve

The present invention was contrived in view of the above-mentioned circumstances, and it is an object of the invention to provide an optical isolator of a reduced size, through a combination of a Faraday rotator having a high Faraday effect in the wavelength range of 600-800 nm and a magnet having a small external dimension.

In order to attain this object, the present inventors made a wholehearted effort, and came to a conclusion that in the wavelength range of 600 nm-800 nm it is desirable that the Verdet constant is 0.60 min/Oe·cm or greater in order to secure that the length of the Faraday rotator is 11 mm or smaller, and that if the Verdet constant is small than that, the length of the Faraday rotator must be greater than 11 mm in the case of the predetermined magnetic field employed so that it is very difficult to reduce the size of the optical isolator. For this reason, the present inventors continued the study and developed an oxide material which contains terbium oxide in an amount of 50% or greater in terms of mass ratio, as a material that enables Verdet constant to be 0.90 min/Oe·cm or greater in the case of a wavelength of 633 nm, and found that if this oxide material is used to make a Faraday rotator, it is possible to shorten the length of the rotator to 11 mm or smaller. Also, the inventors came to realize that it is possible to attain further downsizing through a combination of this oxide material having high Faraday effect with a hollow magnet having a high magnetic flux density, and hence they possessed the present invention.

Means to Solve the Problem

In particular, the present invention is about an optical isolator for use with a wavelength band of 600-800 nm having a Faraday rotator made of an oxide material containing an oxide represented by formula (I) in an amount of 99% or higher and having a Verdet constant of 0.90 min/Oe·cm or greater in the case of a wavelength band of 633 nm, and a hollow magnet arranged to surround the Faraday rotator, and the invention is also characteristic in that the sample length L (cm) along which the Faraday rotator is arranged is in the range represented by inequality (1) and that the magnetic flux density B (Oe) impressed on the Faraday rotator is in the range represented by inequality (2)

$$(Tb_xR_{1-x})_2O_3 \quad (I)$$

wherein 0.5≤x≤1.0, and R is at least one element selected from scandium, yttrium and any lanthanoid but Tb;

$$0.6 \leq L \leq 1.1 \quad (1)$$

$$B \leq 0.5 \times 10^4 \quad (2).$$

Preferably the oxide of the present invention is in the form of either single crystal or ceramic, and also preferably the Faraday rotator of the present invention has an insertion loss of 1 dB or smaller and an extinction ratio of 30 dB or greater when the sample length L is as defined in the inequity (1).

Furthermore, the hollow magnet of the present invention is preferably a neodymium iron boron-base magnet (Nd—Fe—B system magnet).

Effects of the Invention

According to the present invention, it is possible to further downsize the optical isolator, so that it becomes possible to expand the freedom in spatial dimensioning within the laser equipment in which the inventive optical isolator is incorporated. Also, the length of the Faraday rotator is about a half of that of the conventional TGG Faraday rotator, so that the absorption loss can be decreased and, as a result, the insertion loss, which is an important aspect of the optical isolator, is also decreased.

EXAMPLES TO EMBODY THE PRESENT INVENTION

We will now explain an example of how the present invention is embodied, but the scope of the present invention shall not be construed any way limited by the example.

Figure 1:
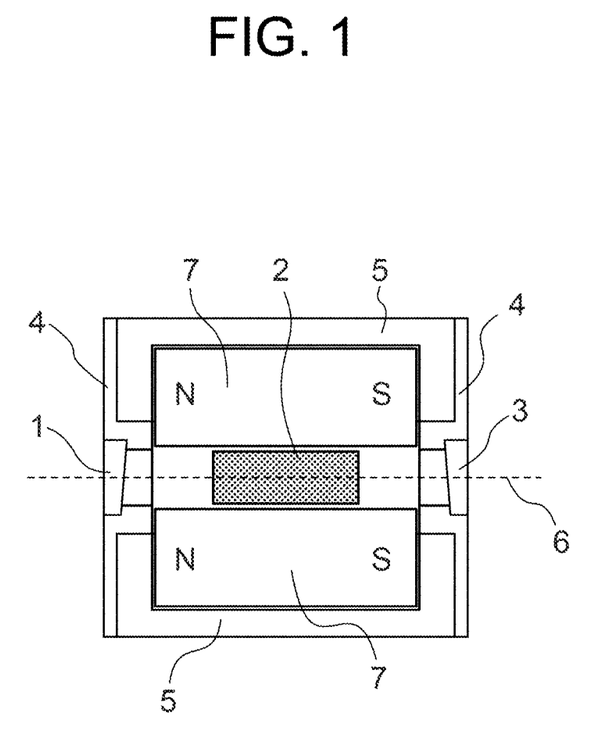
FIG. 1 is a schematic cross section of an example of an isolator of the present invention.

It is recommended that the isolator of the present invention be used for the laser beam of a wavelength band of 600-800 nm, and such laser includes a semiconductor laser. Incidentally, it is also possible to convert the isolator of the present invention for use with laser beams that have wavelength bands differing from the above-described. FIG. 1 is a schematic cross section of an example of an isolator of the present invention. It is seen in FIG. 1 that an input polarizer 1, a Faraday rotator 2 and an output polarizer 3 are aligned in a row on an optical axis 6 from the beam entrance side (left) to the beam exit side (right). On the beam entrance side the input polarizer 1 is fixed by a polarizer holder 4, and on the beam exit side the output polarizer 3 is fixed by a metallic holder 5.

The shape of the Faraday rotator 2 is not limited and may be triangular prism, quadrangular prism, but preferably cylindrical; hence in the following example, a cylindrical Faraday rotator 2 is adopted. This cylindrical Faraday rotator 2 is enveloped by a hollow magnet 7. As the Faraday rotator 2 is cylindrical, it is preferable that the hollow magnet 7 is in a shape of a hollow cylindrical tube, and it is preferable also that the center line of the Faraday rotator 2 and that of the hollow of the hollow magnet 7 coincide with each other. An outer diameter of Faraday rotator 2 and the inner diameter of the hollow of the hollow magnet 7 are close to each other, and it is preferable that the alignment of the axes is done after the assembling of the optical isolator. By this manner of arrangement, the Faraday rotator 2 is positioned in the middle of the hollow magnet 7.

Next, the optical isolator of the present invention has a Verdet constant of 0.90 min/Oe·cm or greater in the case of a wavelength of 633 nm, and this Faraday rotator will be further explained.

It is preferable that the Faraday rotator of the present invention is made of an oxide material containing terbium oxide, which has a Verdet constant of 0.90 min/(Oe·cm) or higher as of a wavelength of 633 nm, in an amount of 50% or greater in terms of mass ratio. In particular, said oxide material contains the oxide represented by formula (I) by 99% or higher, and it may also contain a sintering auxiliary agent:

$$(Tb_xR_{1-x})_2O_3 \qquad (I)$$

wherein $0.5 \leq x \leq 1.1$, and R includes at least one element selected from a group of lanthanoid elements excepting Tb. It is also preferable that the content of this oxide is 99.9 mass % or higher, and more preferably it is 100 mass %.

In a case wherein such a single crystal oxide is used to make a Faraday rotator for an optical isolator, it is preferable that its cut faces are mirror-finished with a polishing agent or the like. The polishing agent may be any abrasive compound such as colloidal silica.

In the present invention, the Verdet constant is not limited in particular so long as it is not lower than 0.90 min/(Oe·cm), but it cannot be higher than the value which is exhibited when the content of the terbium oxide is 100%. The Verdet constant should be 0.90 min/(Oe·cm) or higher, or else the length of the Faraday rotator that secures the Faraday rotational angle of 45 degrees becomes so lengthy that the downsizing of the optical isolator becomes difficult. The Verdet constant may be measured by a conventional method, and there is no particular requirement for the purpose of this invention. In other words, a piece of oxide having a predetermined thickness is cut out, mirror-polished, and the resultant Faraday rotator is set in an eternal magnet piece having a known magnitude of magnetic flux density, and the Verdet constant as of the wavelength of 633 nm is measured in the atmosphere at a temperature of 25 plus/minus 10 degrees C.

Concrete examples of the composition of the invented $(Tb_xR_{1-x})_2O_3$ are listed in Table 1 together with their Verdet constants.

TABLE 1

| | composition | | |
|---|---|---|---|
| | $(Tb_xSc_{1-x})_2O_3$ | $(Tb_xY_{1-x})_2O_3$ | $(Tb_xLu_{1-x})_2O_3$ |
| Verdet constant when x = 0.5 [min/(Oe · cm)] | 0.90 | 0.91 | 0.91 |
| Verdet constant when x = 0.6 [min/(Oe · cm)] | 1.02 | 1.02 | 1.02 |

It is preferable in the present invention that the sample length L (cm) along which the Faraday rotator is set satisfies the following inequality (1):

$$0.6 \leq L \leq 1.1 \qquad (1).$$

If the sample length exceeds 1.1 cm, it becomes difficult to further downsize the isolator, and if it is smaller than 0.6 cm, the required magnetic flux density that secures the desired Faraday rotational angle becomes so great that, again, furthering of the isolator downsizing becomes difficult.

The Faraday rotator of the present invention preferably has an insertion loss of 1 dB or smaller and an extinction ratio of 30 dB or greater when the sample length L is as defined in the inequity (1). If the sample length L satisfies the inequality (1), it becomes possible to manufacture an optical isolator which is equipped with preferable optical properties of low loss and high isolation.

Incidentally, the optical properties such as insertion loss and extinction ratio were measured in accordance with conventional methods in the atmosphere at a temperature of 25 plus/minus 10 degrees C. using a wavelength of 633 nm.

It is also preferable that the Faraday rotator of the present invention has a transmittance (optical transmittance) of 80% or higher when measured with a wavelength of 633 nm and the sample length L (cm) in the range of $0.6 \leq L \leq 1.1$, and it is more preferable if 82% or higher, and even more preferable if 85% or higher. The higher the transmittance is, the greater the result, and therefore its upper limit is 100%.

The transmittance is determined based on the transmitted beam intensity as a beam of a wavelength of 633 mm is transmitted through a Faraday rotator having a thickness of L (cm). In particular the transmittance is obtained by the following equation:

$$\text{Transmittance} = I/Io \times 100$$

wherein I is the transmitted beam intensity [the intensity of the beam that has passed through a sample of a thickness of L (cm), and Io is the incident beam intensity. Incidentally, if the transmittance values of an oxide material as obtained are not uniform so that the values of the transmittance vary with the locations of the measurement, the transmittance of the oxide is determined to be an average of the transmittance values obtained with respect to ten arbitrary locations.

Next, we will explain about the hollow magnet which is used in the optical isolator of the present invention. It is preferable that the size of the hollow magnet 7 is the smallest possible, and in order to secure a large magnetic field strength it is preferred that a neodymium iron boron-base magnet (Nd—Fe—B system magnet) is used; and preferably a carbon steel case is used to contain the magnet, for the reason that if the hollow magnet 7 is contained in the carbon steel case, a yoke is formed around the hollow magnet 7 so that the adsorptive power or the attractive force of the hollow magnet 7 is enhanced.

Preferably, the hollow magnet 7 of the present invention has its magnetic field polarity in the direction of the optical axis 6, as shown in FIG. 1, and also preferably a holder 5 made of a metal such as carbon steel is provided to surround the hollow magnet 7 so as to function as a yoke. By arranging in this manner it becomes possible to maximize the magnetic flux density applied to the Faraday rotator 2.

The base design policy of the optical isolator of the present invention is to shorten the length of the Faraday rotator 2 to downsize the isolator so that it is important that a Faraday rotator 2 having a high Faraday effect is combined with a hollow magnet 7 having a large magnetic flux density.

The magnitude of an optical damage, which is caused upon the Faraday rotator 2 by the high power beam, —a problem that takes place when a semiconductor laser is used for an optical isolator—is determined by the transmittance and the length L of the Faraday rotator 2, so that in order to mitigate this optical damage it is more preferable that the transmittance of the Faraday rotator 2 is higher and the length L is shorter.

Furthermore, it is preferable in the optical isolator of the present invention that two or more polarization-dependent glass polarizers are arranged on the optical axis, for by virtue of this construction it is possible to obtain a polarization-dependent optical isolator. It is preferable that two or more pieces of flat plate birefringent crystal and one or more pieces of 45-degree azimuth rotator are provided on the optical axis 6, for by doing so it is possible to impart to the resulting isolator a polarization-independency as well.

And in this case, it is preferable that the optical axis of the plate birefringent crystal is about 45 degrees slanted from the optical axis 6, and that its thickness is 1.0 cm or greater. For example, when a rutile single crystal ($TiO_2$) is used, the isolator will be capable of accommodating to a beam of a diameter of up to 1.0 mm, which is one tenth of the thickness, and when an .—BBO crystal ($BaB_2O_4$) is used, the isolator will be capable of accommodating to a beam of a diameter of up to 0.35 mm, which is one thirtieth of the thickness.

EXAMPLES

Herein below, we will explain about the examples of the present invention.

Example 1

In Example 1, an optical isolator of 633 nm band having a structure as shown in FIG. 1 was made. An absorption type glass polarizer having a high transparency and a high extinction ratio in the 633 nm band was used to make an input polarizer 1 and an output polarizer 3, and an antireflective film having a central wavelength of 633 mm was adhered to the beam transmittance faces, and in order to prevent the reflected beam from returning from the beam transmittance face to the incident beam path, metallic holders 5 are inserted by bonding them onto a polarizer holder 4, which has a tilt angle of 5 degrees, at the four corners of the bottom face of the polarizer.

Then, the Faraday rotator 2 was fixed in the middle of the hollow of the hollow magnet 7 after adjusting its position in a manner such that the magnetic field distribution created by the magnet becomes greatest. The input polarizer 1 and the output polarizer 3, which are arranged in this progressive order along the progressive path of the incident beam, are adjusted such that their optical axes are directed in such directions that a maximum isolation property is obtained when the beam passing through the Faraday rotator 2 is twisted by the polarization angle of 45 degrees; thereupon the outer connective parts of the polarizer holders 4 and the metallic holders 5 were welded and fixed by laser. An antireflective film (not shown in drawings) having a central wavelength of 633 mm is applied to the beam transmittance faces of the Faraday rotator 2.

As for the material to make the Faraday rotator, it is possible to use an oxide material, which gives rise to a Verdet constant of 0.90 min/Oe·cm or greater in the case of wavelength band of 633 nm, represented by the above-mentioned formula (I) wherein R consists of at least one element selected from scandium, yttrium and any lanthanoid but Tb; in particular it may be any one of the oxide materials having compositions as shown in Table 1, namely terbium/scandium oxide, terbium/yttrium oxide, or terbium/lutetium oxide. Also, the sample length L of this Faraday rotator 2 was 0.8 cm, and the hollow magnet 7 consisting of a neodymium iron boron-base magnet (Nd—Fe—B system magnet) was placed to surround the Faraday rotator 2, and the carbon steel case was provided to encase these.

We will explain the details of the Faraday rotator 2 of Example 1 further; in this Example 1, a ceramics consisting of a terbium/scandium oxide containing terbium oxide by 60 wt % was used to make the Faraday rotator 2. The optical properties of this ceramics were measured with respect to wavelength 633 nm band: the insertion loss was 0.2 dB, the extinction ratio was 40 dB, and the Verdet constant was 1.02 min/(Oe·cm). The dimension of the cylindrical sample used for the measurement was 0.3 cm in outer diameter and 0.80 cm in length.

Figure 2:
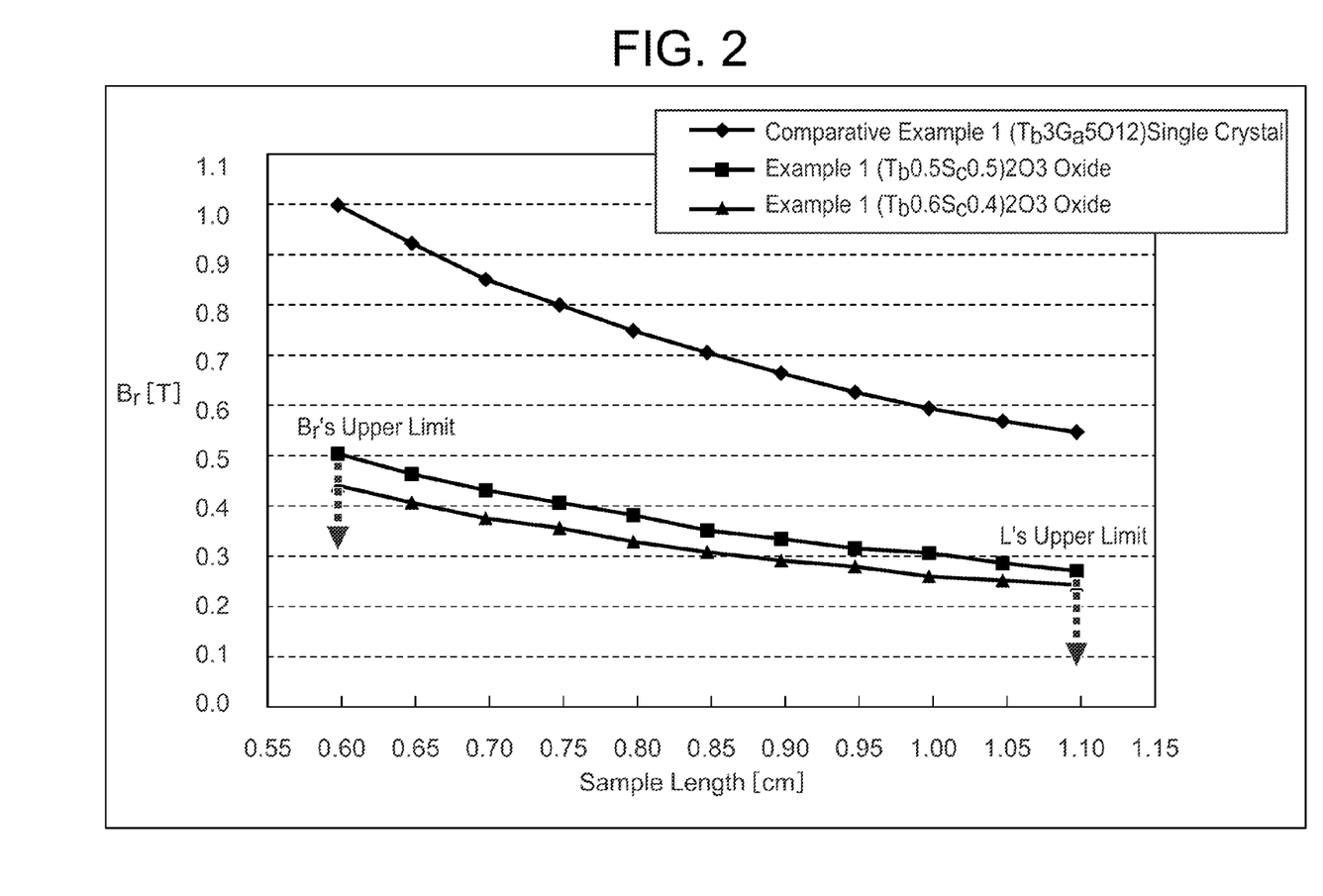
FIG. 2 is a graph showing a relation between the sample length L of Faraday rotator (0.6-1.1 cm) and the magnitude of the magnetic flux density T ($10^4$ Oe) at which the Faraday rotational angle becomes 45 degrees.

FIG. 2 shows, with respect to the terbium/scandium oxide containing terbium oxide by 60 wt % used in Example 1 and the terbium/scandium oxide containing terbium oxide by 50 wt %, a relation between the magnetic flux density T ($10^4$ Oe) and the sample length L (cm) the respective combination of which brings about the Faraday rotational angle of 45 degrees, as plotted in the cases of the sample length L whose value is increased stepwise by 0.05 cm from 0.60 through 1.10 cm; also shown in FIG. 1 is a similar relation between the magnetic flux density T ($10^4$ Oe) and the sample length L (cm) with respect to $Tb_3Ga_5O_{12}$ of Comparative example 1. Incidentally, FIG. 2 shows a result in the case of R being scandium, a similar result is obtainable in the case of R being lutetium.

Then, in the case of the Faraday rotator 2 of Example 1, the sample length L being 0.80 cm and the Verdet constant of the Faraday rotator 2 being 1.02 min/(Oe·cm), it is found from the relation in FIG. 2 that the magnetic flux density which gives rise to the Faraday rotational angle of 45 degrees is to be about 3,300 [Oe] or 0.33 [T].

Also, in the present invention, the lower limit for the Verdet constant is 0.90 min/Oe·cm, and to stay above this lower limit the material used to make the Faraday rotator 2 ought to be an oxide material which contains terbium oxide by at least 50% in terms of mass ratio. And, as the lower limit for the sample length L is 0.6 cm, the upper limit for the magnetic flux density of this oxide material is to be $0.5 \times 10^4$ [Oe] (=0.50 [T]) in the case of a sample length L of 0.6 cm, as figured out from the relation in FIG. 2.

Therefore, for the purpose of furthering the downsizing of optical isolators, it is preferable that the magnet used in the present invention has a magnetic flux density B (Oe) that satisfies the following inequality (2):

$$B \leq 0.5 \times 10^4 \qquad (2).$$

Figure 3:
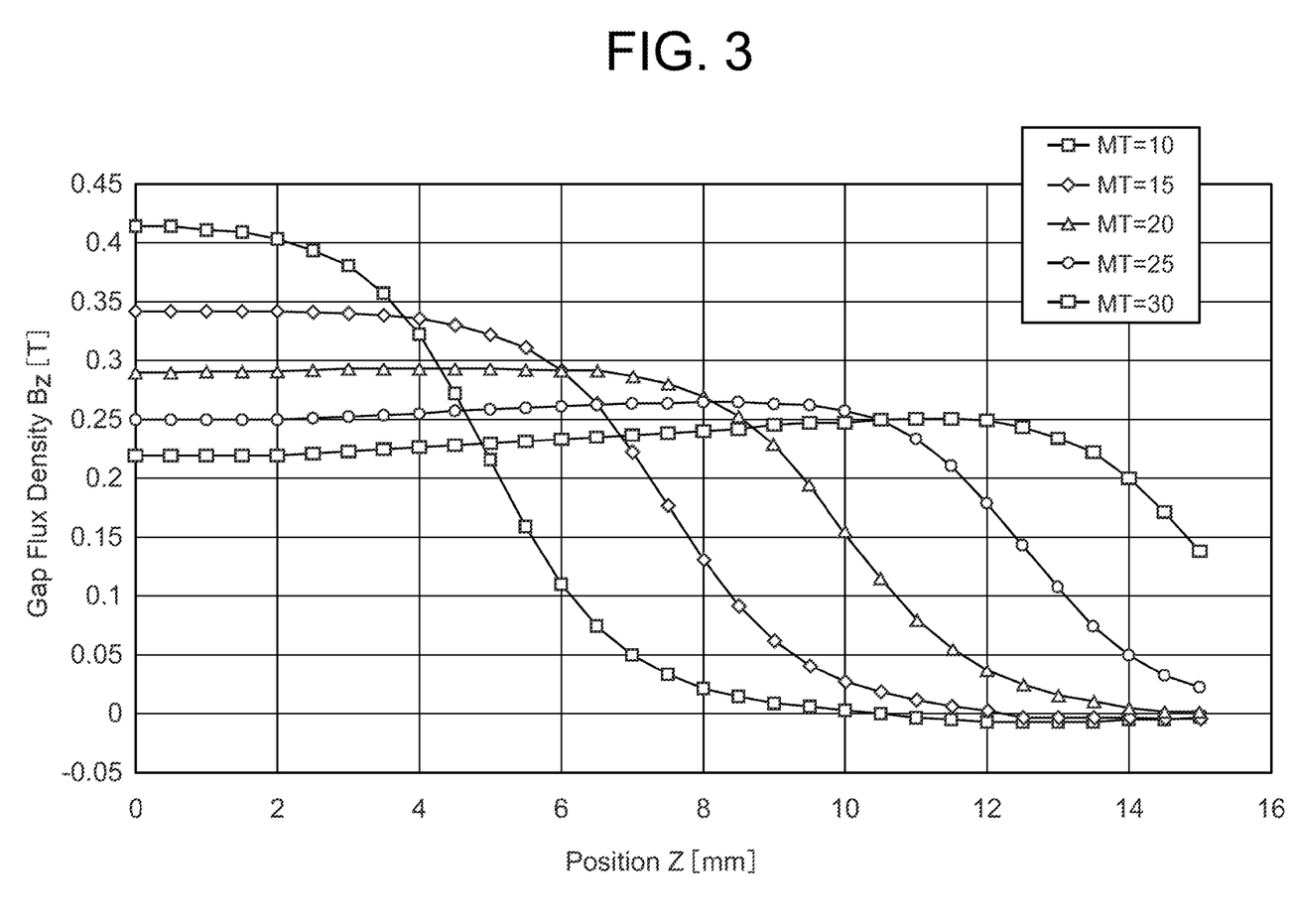
FIG. 3 is a simulation chart of magnetic flux density for the purpose of calculating the magnet dimension used in Example 1.

Next, the dimension of the magnet that would secure the magnetic flux density of Example 1 will be explained: the magnet dimension was obtained through electromagnetic field analysis in the following manner. In particular, a finite element method (JMAG-Designer) was adopted as the electromagnetic field analysis, and a neodymium iron boron-base magnet (Nd—Fe—B system magnet) manufactured by Shin-Etsu Chemical Co., Ltd. was used as the material to make the magnet, and a carbon steel was chosen as the material to make the metallic holder 5. Then, the outer diameter of the magnet was made 2.5 cm, and FIG. 3 shows a result of a simulation of magnetic flux density distribution which was obtained with respect to different lengths (MT) as the parameter. Incidentally, in this simulation, the dimension and performance parameters (magnetic flux density and coercive force) were input for the finite element method to conduct the analyses.

According to the results shown in FIG. 3, it was found that the dimension of the magnet that gives rise to a magnetic flux density which corresponds to the wave path length L of 0.80 cm of Example 1 is 0.4 cm in inner diameter, 2.5 cm in outer diameter, and 1.5 cm in length. In FIG. 3, Z [mm] is a distance from the center of the optical axis 6, and the sample length L [cm] is obtained by a calculation of 2×Z/10.

Then, an optical isolator was assembled within the wavelength band of 633 nm, and it turned out an optical isolator having optical properties of 0.3 [dB] in insertion loss and 42 [dB] in isolation.

Comparative Example 1

In Comparative Example 1, an optical isolator having a Faraday rotator made of a single crystal of a composition of $Tb_3Ga_5O_{12}$ (Verdet constant being 0.45 min/(Oe·cm)) was made. The magnetic flux density to be impressed to this TGG single crystal is calculated to be about 4,000 [Oe] (=0.4 [T]) when the sample length is 1.5 cm, from the equation •=v×H×L. Now, similarly as in the case of Example 1, in order to obtain the magnet dimension, a simulation was conducted of the magnetic flux density distribution which is obtained in the case of an outer diameter of 3.5 cm and with the length (MT) as the parameter, and the result is shown in FIG. 4.

Figure 4:
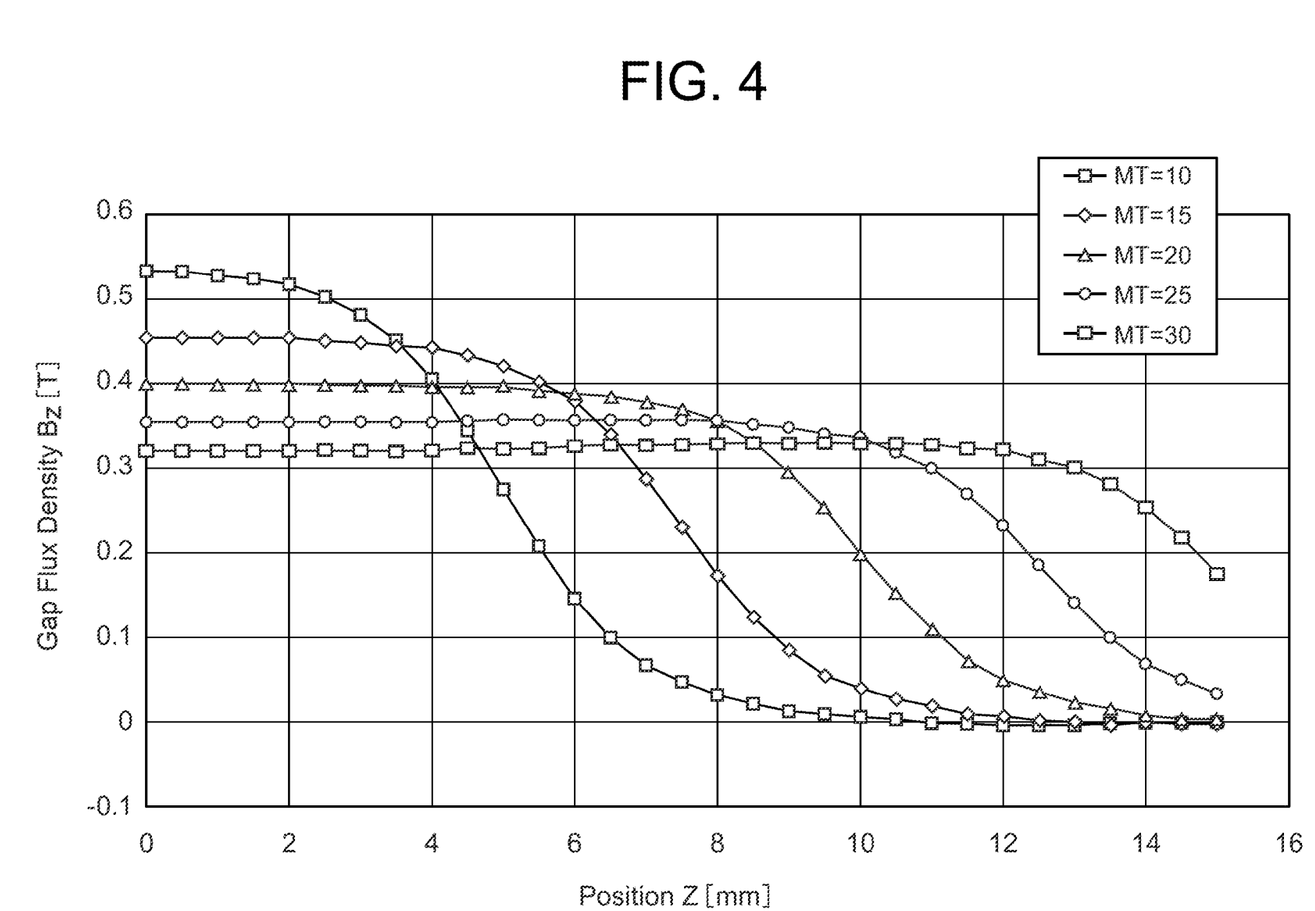
FIG. 4 is a simulation chart of magnetic flux density for the purpose of calculating the magnet dimension used in Comparative Example 1.

According to this FIG. 4, it was found that the dimension of the magnet that gives rise to a magnetic flux density in Comparative Example 1 is 0.4 cm in inner diameter, 3.5 cm in outer diameter, and 2.0 cm in length. In FIG. 4, Z [mm] is a distance from the center of the optical axis 6, and the sample length L [cm] is obtained by a calculation of 2×Z/10.

Based on the results as obtained above, the volume of the magnet was calculated from the outer diameter and the length thereof, and the results were compared between Example 1 and Comparative Example 1, and it was found that the optical isolator of Example 1 is downsized to an extent that its volume is 60% of the TGG optical isolator of Comparative Example 1.

Also, since Verdet constant has a wavelength dependency, and it is known that in general the value of Verdet constant decreases as the wavelength increases, and thus the Verdet constant was estimated as of the 800 mm band, which is the upper limit of the 600-800 nm band, and it was found that in the case of TGG of Comparative Example 1, the constant there was 0.28 min/(Oe·cm), and as opposed to this that in Example 1 was 0.62 min/(Oe·cm) so that it was confirmed that even in the case of the long wavelength of 800 nm the isolator of the present invention was confirmed to have a performance twice or more superior to the Comparative Example.

Hence, it was confirmed that the optical isolator of the present invention is practically employable as a well downsized optical isolator, while at the same time it has the property of low loss and high isolation in the range of 600-800 nm band.

REPRESENTATION OF REFERENCE NUMERALS

1: input polarizer
2: Faraday rotator
3: output polarizer
4: polarizer holder
5: metallic holder
6: optical axis
7: hollow magnet Scopes of what is claimed:

1. A optical isolator for use with a wavelength band of 600-800 nm, comprising:
   a Faraday rotator made of an oxide material containing an oxide represented by formula (I) in an amount of 99% or higher and having a Verdet constant of 0.90 min/Oe·cm or greater at a wavelength band of 633 nm, and
   a hollow magnet arranged to surround the Faraday rotator,
   wherein a sample length L (cm) through which the Faraday rotator is arranged is in a range represented by an inequality (1) and that magnetic flux density B (Oe) impressed on the Faraday rotator is in a range represented by inequality (2),
   wherein the formula (I), the inequality (1), and the inequality (2) are $$(Tb_xR_{1-x})_2O_3 \tag{I}$$

wherein 0.5≤x≤1.0, and R is at least one element selected from scandium, yttrium and any lanthanoid but Tb, $$0.6 \le L \le 1.1 \tag{1}$$

and $$B \le 0.5 \times 10^4 \tag{2}$$

2. An optical isolator as claimed in claim 1, wherein said oxide is in a form of single crystal or ceramic.

3. An optical isolator as claimed in claim 1, wherein said Faraday rotator has an insertion loss of 1 dB or lower and an extinction ratio of 30 dB or higher when said sample length L satisfies inequality (1).

4. An optical isolator as claimed in claim 1, wherein said hollow magnet is made of a neodymium iron boron-base magnet.

5. An optical isolator as claimed in claim 2, wherein said Faraday rotator has an insertion loss of 1 dB or lower and an extinction ratio of 30 dB or higher when said sample length L satisfies inequality (1).

6. An optical isolator as claimed in claim 2, wherein said hollow magnet is made of a neodymium iron boron-base magnet.